(No Model.) 2 Sheets—Sheet 1.
R. A. LANG.
GATE FOR WATER WAYS.
No. 425,231. Patented Apr. 8, 1890.
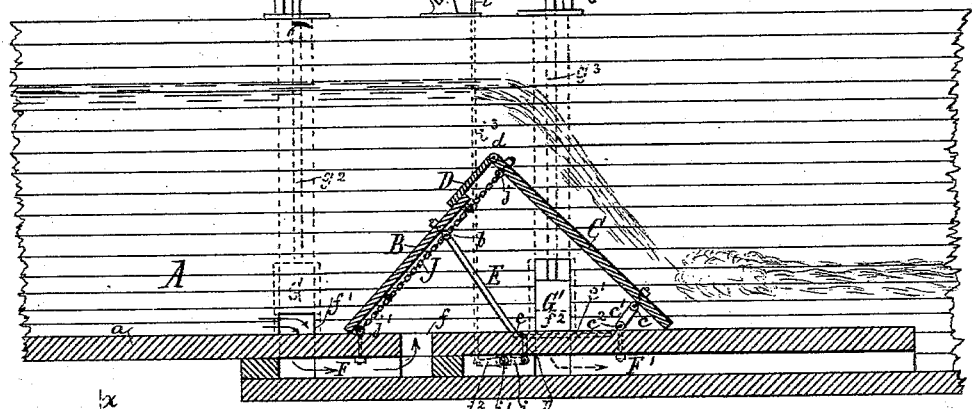
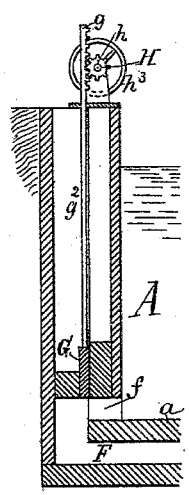
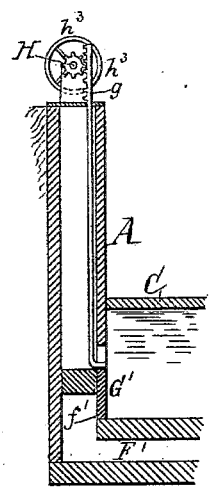
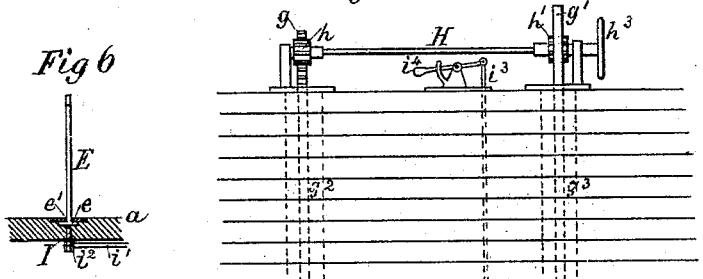
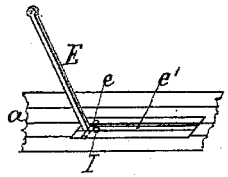
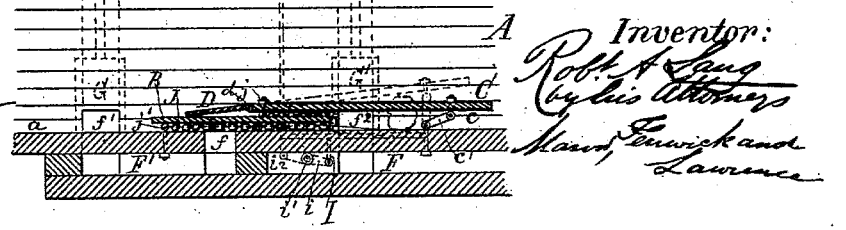
Witnesses:
J. P. Theo Lang
E. T. Fenwick
Inventor:
Robt. A. Lang
by his attorneys
Mauro, Fenwick and Lawrence (No Model.) 2 Sheets—Sheet 2.
R. A. LANG.
GATE FOR WATER WAYS.

No. 425,231. Patented Apr. 8, 1890.

Witnesses:
J. P. Theo Lang
E. T. Fenwick

Inventor:
Robt. A. Lang
by his Attorneys
Mason, Fenwick & Lawrence

UNITED STATES PATENT OFFICE.

ROBERT A. LANG, OF EAU CLAIRE, WISCONSIN.

GATE FOR WATER-WAYS.

SPECIFICATION forming part of Letters Patent No. 425,231, dated April 8, 1890.

Application filed October 26, 1889. Serial No. 328,229. (No model.)

*To all whom it may concern:*

Be it known that I, ROBERT A. LANG, a citizen of the United States, residing at the city of Eau Claire, in the county of Eau Claire and State of Wisconsin, have invented certain new and useful Improvements in Submerged Gates for Water-Ways; and I do hereby declare the following to be a full, clear, and exact description of the invention, such as will enable others skilled in the art to which it appertains to make and use the same.

My invention relates to submerged gates as commonly used in rivers and canals for the purpose of raising the water-level to a height sufficient for navigation, floating timber, and other purposes; and it consists of certain novel constructions, combinations, and arrangements of parts, as hereinafter fully described and specifically claimed, whereby the construction of such gates is greatly simplified, their cost reduced, and their operation facilitated and durability increased.

Figure 8:
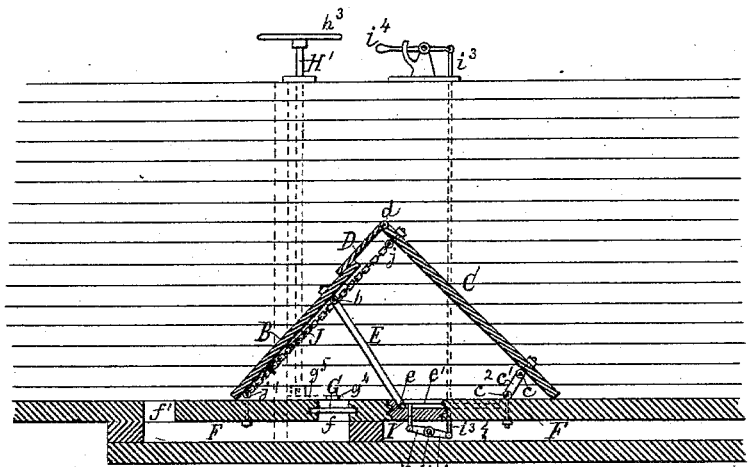
Figure 9:
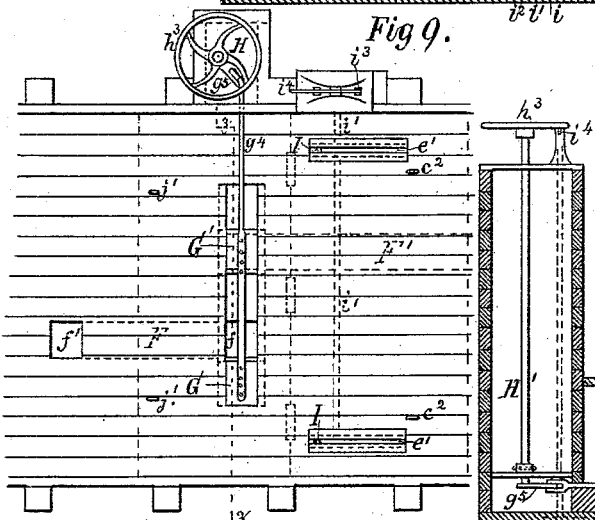
Figure 10:
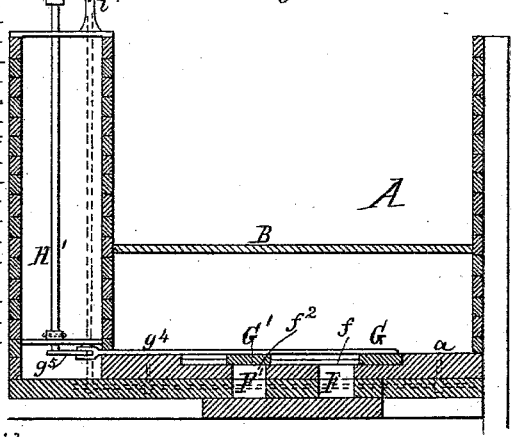
Figure 11:
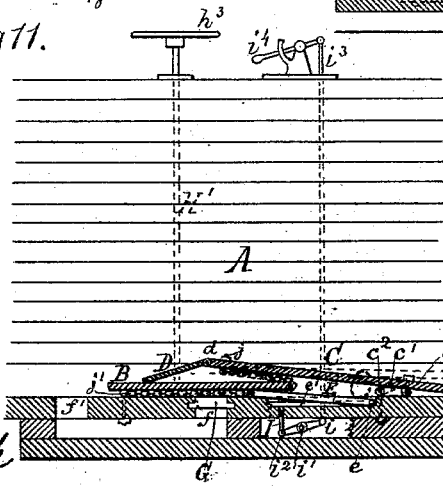
Figure 12:
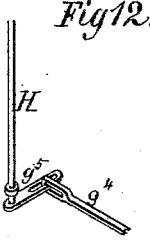

In the accompanying drawings, Figure 1 is a vertical central longitudinal section of my invention, showing the gate as applied and raised. Fig. 2 is a top view of the same. Fig. 3 is a vertical section in the line $x\ x$ of Fig. 2. Fig. 4 is a vertical section in the line $y\ y$ of Fig. 2. Fig. 5 is a vertical central longitudinal section showing the gate lowered. Fig. 6 is a detail view of a brace used to support the gate when raised. Fig. 7 is a perspective view of the same and its foot-bearing. Fig. 8 is a vertical central longitudinal section of another equivalent mechanical construction of my invention, showing the gate raised. Fig. 9 is a top view of the same, showing the gates B and C in dotted outlines in order to expose to view the operating parts. Fig. 10 is a transverse vertical section in the line $z\ z$ of Fig. 9. Fig. 11 is a vertical central longitudinal section similar to Fig. 8, excepting that the gate is represented as lowered; and Fig. 12 is a perspective view of the foot portion of a crank mechanism for operating the gate-valves.

The letter A in the drawings represents an artificial water-way; B, breast-wing; C overfall-wing, and D lap-board, of the gate; E, brace; F F', water-tunnels; G G', valves of said tunnels; H, shaft for operating the valves; I, check-bolts for braces E, and J check-chains for overfall-wing.

The water-way A may be an ordinary wooden structure, as shown, into which the gate is fitted. The overfall-wing C of the gate is hinged at $c$ to links $c'$, which are hinged at $c^2$ to the flooring $a$ of the water-way. Near its top edge the overfall-wing is provided with chains or linked bars J, which are fastened at $j$ to said wing and at $j'$ to the flooring. To these chains the breast-wing B is suitably attached, and thus it is caused to rise and fall simultaneously with the rising or falling overfall-wing C. The space between the tops of the raised breast-wing and overfall-wing is covered by a lap-board D, hinged to the overfall-wing at $d$, and snugly fitted to the same, so as to form a water-tight joint at the apex of the gate.

The breast-wing B is provided with braces E, hinged to the same at $b$ above the balancing-point of the outside water-pressure, and having foot-formations $e$ of T shape, which latter slide in T-shaped grooves $e'$, formed in the flooring $a$. These braces E are held in the forward end portions of the grooves $e'$ by means of vertically-sliding check-bolts I, by which the braces and the breast-wing are sustained at their highest elevation and prevented from collapsing.

Each of the check-bolts I is pivoted to a lever $i$ of a transverse shaft $i'$, which latter can, by means of a lever $i^2$, connecting-rod $i^3$, and hand-lever $i^4$, be operated on land at the side of the water-way A, as shown. Thus, by moving the hand-lever $i^4$ down, the check-bolts I are moved down out of the range of grooves $e'$, and the T-shaped foot formations $e$ can now slide forward in said grooves as the water confined within the gate is flowing out from beneath the same.

For the purpose of introducing and removing water from and to the gate, water-tunnels F F' are provided below the flooring $a$. The tunnel F is connected with the inner space of the gate by means of a port-hole $f$ and with the water-way ahead of it by means of a port-hole $f'$ in the side wall of the water-way A, which hole $f'$ can be opened or closed by means of a sliding valve G, secured in said side wall. The tunnel F' connects the inner space of the gate with the natural water-course below by means of a port-hole $f^2$, which can be opened or closed by means of a sliding valve G', secured in the side wall of the water-way A. Both valves are simultaneously operated by a shaft H, having pinions $h\ h'$, which gear into racks $g\ g'$, connected by means of rods $g^2\ g^3$ with the valves G G', respectively. The racks $g\ g'$ are arranged on opposite sides of the shaft H, whereby they are operated in opposite directions when said shaft is turned, which is done by means of a hand-wheel $h^3$ or any other suitable contrivance.

When the gate is in operation, the port-hole $f'$ is open, and the inner space beneath the gate is constantly filled with water through said port-hole. The port-hole $f$ is closed, and the braces E are locked by the bolts I. At this stage of the operation, although there exists, incidentally, an opening above the valve G', this opening has no communication with the discharge-tunnel F, as said opening is walled in.

When the gate is to be lowered, the hand-lever $i^4$ is moved up, thereby moving the check-bolts I out of the grooves $e'$ and unlocking the braces E. The shaft H is now turned to the right by means of the hand-wheel $h^3$, which causes the valve G to move down and the valve G' to move up. Thus the water-supply is gradually cut off and the discharge is started and gradually increased. The effect of this operation is a gradual discharge of the water from the gate without shock, and consequently without injury to the gate, which descends as the water inclosed therein passes out. The breast-wing B begins to yield to the pressure of the water upon its outside, and in swinging down causes the chains J to pull the wing C along with it until at last the wing B rests upon the chains J and the wing C upon the wing B. While the wing B descends the T-shaped foot formations of the braces E slide forward in the grooves $e'$, and when the wing B is at its lowest level the greater portion of said braces is inside the grooves $e'$. At the same time the wing C, folding over the wing B, also folds the chains over and upon the wing B, as seen in Fig. 5. When the gate is to be raised, the hand-wheel $h^3$ is turned to the left, thereby causing the valve G to move up and open the port $f'$ and the valve G' to move down and open the port $f^2$. Thus a current of water is directed under the gate-wings B C, which, by abutting against the under sides of the said wings, overbalances the water-pressure from above and lifts the wings up. The water-current entering the gate through the tunnel F and leaving it through tunnel F' is gradually deprived of its speed and impulse by the simultaneous gradual closing of the port $f'$ and opening of port $f$. By this operation the wings B and C are at first moved by the impulse of the current beneath, and then when their lower edges begin to rest upon the flooring $a$ and form a closed chamber the pressure or weight of the water entering serves to elevate the gate to the required height. When the wing C has attained its proper elevation, its further upward movement is checked and anchored by chains J, and while the wing B rises the T-shaped foot formations $e$ of the braces E slide backward in the grooves $e'$ until they have passed the bolts I, which bolts are now moved up into the grooves. The braces now being locked, the gate is kept steady by the same and cannot be influenced by varying pressure from changes in the water-level. The gate will thus maintain its position even when the water is withdrawn from it for the purpose of repairs or for the purpose of preventing it from being covered with ice.

I have avoided direct pivoting of the wings B C to the flooring $a$ by adapting the chains J for holding the wing B and providing the links $c'$ for holding the wing C. By this construction obstructions—such as pieces of ice, stones, and the like—which may be carried under the wings B C of the gate, with the water by which they are raised, will not interfere with the operation of the gate or endanger the same. Thus when obstructions have been washed into the interior of the gate and the gate is to be lowered the wings B or C will adjust themselves upon said obstructions by means of their accommodating joints J and $c'$ without strain or breakage.

Instead of placing the valves G G' in the side wall of the water-way, I can place them upon the flooring $a$, as shown in Figs. 9 and 10, without departing from my invention, and such construction will in some cases be found preferable on account of its simplicity, such construction admitting of the two valves being directly and rigidly coupled by means of a connecting-rod $g^4$, which is moved by a crank $g^5$ of a crank-rod H', said crank-rod being provided with hand-wheel $h^3$, by which it and the valves are operated. The valve G opens or closes the port $f$ of the tunnel F, which communicates with the head water by means of a port $f'$, and the valve G' opens or closes the port $f^2$ of tunnel F', which communicates with the water below the gate. Turning the hand-wheel $h^3$ to the right, the valve G will expose the port $f$ and the valve G' close the port $f^2$, and by reversing this movement of the hand-lever the port $f^2$ will be opened and the port $f$ closed.

It is obvious that the details of construction shown may be varied in various equivalent ways without departing from my invention, and therefore I do not confine myself to the precise details of construction shown.

What I claim is—

1. In a water-way submerged gate, the breast-wing B, chain J, having fastenings $j\ j'$, overfall-wing C, link $c'$, and lap-board D, in combination with the tunnels F F', having ports $f\,f'\,f^2$, and the simultaneously and reversely operated valves G G', substantially as described.

2. In a submerged gate of the type described, the combination of supply and exhaust ports $f\,f'\,f^2$, valves G G', and racks $g\,g'$, gearing into pinions $h\,h'$ on shaft H, and arranged on diametrically-opposite sides of said pinions, substantially as described.

3. In a submerged gate of the type described, the breast-wing B, chains J, anchored to the flooring $a$ of the water-way and to the top portion of the overfall-wing C, and the sliding braces E, pivoted to the wing B, and means for locking said braces, substantially as described.

4. The anchoring-chain J, in combination with the wing B, free at its lower end, and wing C, connected at its lower end to the flooring, substantially as described.

5. In a submerged gate of the type described, the wing C, having links $c'$, pivotally connected at $c$ and $c^2$, substantially as described.

6. The brace E, held in the groove $e'$ of the flooring $a$, the locking-bolt I, and means for operating said bolt, in combination with the wing B, substantially as described.

In testimony whereof I hereunto affix my signature in presence of two witnesses.

ROBERT A. LANG.

Witnesses:
D. T. WHIPPLE,
J. E. HORAN.